United States Patent [19]
Loutfy et al.

[11] Patent Number: 6,146,791
[45] Date of Patent: Nov. 14, 2000

[54] HYDROGENATED FULLERENES AS AN ADDITIVE TO CARBON ANODE FOR RECHARGEABLE LITHIUM-ION BATTERIES

[75] Inventors: Raouf O. Loutfy; Muhammed Y. Saleh, both of Tucson, Ariz.

[73] Assignee: Materials and Electrochemical Research (MER) Corporation, Tucson, Ariz.

[21] Appl. No.: 09/199,866

[22] Filed: Nov. 25, 1998

[51] Int. Cl.$^7$ .............................. H01M 4/58; C01B 31/00
[52] U.S. Cl. ................... 429/231.8; 429/231.95; 423/445 B; 423/445 R
[58] Field of Search ............................ 429/231.8, 231.95; 423/445 B, 445 R

[56] References Cited

U.S. PATENT DOCUMENTS

5,705,296  1/1998  Kamauchi et al. ..................... 429/218
5,981,107  11/1999  Hamano et al. ..................... 429/231.95

Primary Examiner—Maria Nuzzolillo
Assistant Examiner—Angela J. Martin
Attorney, Agent, or Firm—Jerome M. Teplitz

[57] ABSTRACT

A rechargeable electrochemical cell comprising a body of aprotic, non-aqueous electrolyte, first and second electrodes in effective electrochemical contact with the electrolyte, the first electrode comprising positive active cathode materials such as a lithiated intercalation compound serving as the cathode and the second electrode comprising a modified carbon material formed of a graphite or carbon based materials, for example, having a hydrogenated fullerene material, such as hydrogenated $C_{60}$ or $C_{70}$, adsorbed thereon and serving as the anode; whereby they provide a lithium-ion cell having improved reversible energy storage characteristics and irreversible energy loss characteristics as compared with similar lithium-ion cells having carbon anodes that are not so-modified with hydrogenated fullerene material.

71 Claims, 3 Drawing Sheets

HYDROGENATED FULLERENES AS AN ADDITIVE TO CARBON ANODE FOR RECHARGEABLE LITHIUM-ION BATTERIES

FIELD OF THE INVENTION

The present invention relates generally to nonaqueous rechargeable batteries and, more particularly, to such batteries employing carbon or graphite as the active material for the negative electrode, active material for the positive electrode such as intercalation compounds of lithium including the oxides, carbides, nitrides or sulfides of lithium intercalation compounds, and an aprotic nonaqueous electrolyte in contact with the electrodes.

DESCRIPTION OF THE PRIOR ART

Since its introduction and commercialization in 1991, lithium-ion battery systems have received considerable interest not only to the battery community but also to the academic and electronic industries. In lithium-ion batteries, carbon or graphite is used as an anode, a lithiated transition metal intercalation compound is used as a cathode and $LiPF_6$ is used as an electrolyte in carbonate-based organic solvents. For example, the reactions at the electrodes and overall cell reaction of an oxide containing lithium intercalation compounds are as follows:

where $LiMO_2$ represents the lithiated metal oxide intercalation compound.

The electrochemical process is the uptake of lithium ions at the anode during charge and their release during discharge, rather than lithium plating and stripping as occurs in metallic lithium rechargeable battery systems. As metallic lithium is not present in the cell, lithium-ion cells have enhanced safety and a longer cycle life than the cells containing metallic lithium. Because of their advantageous characteristics, lithium-ion batteries are widely used for consumer electronics applications such as cellular phones, laptop computers, and camcorders.

During the first electrochemical intercalation of lithium ions into the carbon or graphite anode structure, some lithium is irreversibly consumed and a significant amount of capacity can not be recovered in the following discharge. This irreversible capacity loss, which mainly depends on the type of carbon or graphite anode material and electrolyte solution, is explained on the basis of the reduction of the electrolyte solution and the formation of a passivating film at the $Li_xC$ interface. Chemical combination of lithium to the active surface functional groups of carbon may also play an important role in this irreversible capacity loss. This irreversible capacity loss affects the cell balancing and lowers the energy density of lithium-ion batteries.

At present, special-type of hard carbon or graphite are used as anodes in commercial lithium-ion batteries. The carbon/graphite materials deliver a reversible specific capacity of only ~370 mAh/g, corresponding to the chemical formula of $LiC_6$, as compared to 3830 mAh/g for metallic lithium. The main advantage of these special carbon materials is their relatively low irreversible capacity loss ($\leq 10\%$). The special carbon materials are, however, expensive.

There are a number of low cost commercially available carbons and graphite which provide comparable reversible capacity but which are associated with high (~30%) irreversible capacity loss.

In accordance with the present invention, it has been discovered that these low cost carbon/graphite materials can be modified to increase their reversible capacity and decrease the irreversible capacity loss. These modified materials can then be used as active anode materials for lithium-ion battery systems.

The introduction of this modification opens the door for the development of high energy density lithium-ion battery systems. The carbon materials of very high specific capacity (~1,000 mAh/g) which, therefore, were not practical to use in lithium-ion battery systems due to significantly high irreversible capacity loss, can now be used according to the present invention.

OBJECTS AND ADVANTAGES OF PRESENT INVENTION

Accordingly, it is the principle objective of the present invention to improve the reversible capacity and irreversible capacity loss of carbon materials used for the anode of lithium-ion battery systems.

Another objective of the present invention is to provide a novel and improved rechargeable lithium-ion battery systems of high energy density.

Still another objective of the present invention is to provide a novel and improved rechargeable lithium-ion battery system which utilizes a low cost carbon material.

It is a further objective of this invention to present novel and improved methods for producing improved modified carbon anode materials for lithium-ion cells.

SUMMARY OF THE INVENTION

Briefly stated, this invention provides a rechargeable electrochemical cell comprising a body of aprotic, non-aqueous electrolyte, first and second electrodes in effective contact with said electrolyte, the first of said electrode comprising a positive material such as lithiated intercalation compound and the second electrode comprising carbon having a hydrogenated fullerene material adsorbed thereon. In accordance with this invention, commercially available low cost carbon materials which provide high lithium intercalation capacity but which are associated with high irreversible capacity loss are chosen for the negative electrode, i.e., anode of the electrochemical cell. A small quantity of hydrogenated fullerene ($C_{60}H_x$, $C_{70}H_x$ or a mixture of these compounds) is adsorbed on these chosen carbon materials to modify their surfaces. The carbon anode modification results in lowering the irreversible capacity loss of the lithium-ion cell. The hydrogenated fullerenes probably form a protective layer to reduce the solvent decomposition and/or to reduce the activity of the surface functional groups. It is also observed that the surface modification of the carbons by the hydrogenated fullerenes increases lithium intercalation capacity of the modified carbon, which is used as the anode of the lithium-ion cell. This could be due to increased availability of intercalation sites as a result of decreased solvent decomposition and decreased activity of functional groups. A significant number of lithium-ions can also be intercalated to the hydrogenated fullerenes and, therefore, results in increased capacity. The present invention, however, is not limited to the above theory.

In accordance with this invention, two approaches have been used to modify the carbon materials chosen for the anode of the lithium-ion cell or battery. The first approach or process of this invention for modifying carbon materials with hydrogenated fullerenes accordingly comprises the steps of:

dissolving hydrogenated fullerenes in an organic solvent, pouring the carbon materials in the form of powdered graphite or carbon or mixture thereof into the hydrogenated fullerenes solution to produce a mixture thereof, stirring the mixture several hours to adsorb the hydrogenated fullerenes on the carbon materials, decanting off the solvent, and heating and drying the residue to recover the hydrogenated modified carbon.

The hydrogenated fullerene modified carbon is then used as an active material of the anode to develop a high capacity, high energy density lithium-ion battery. The modified carbon provides high reversible capacity for lithium-ion intercalation and low irreversible capacity loss.

Another approach or process of this invention for modifying carbon materials involves dissolution of hydrogenated fullerene in the electrolyte and use of the resulting modified electrolyte in the lithium-ion cell having an initially unmodified carbon anode. Hydrogenated fullerene is sparingly soluble in carbonate-based 1M $LiPF_6$ electrolyte. A saturated solution is used. After adding hydrogenated fullerene modified electrolyte to the lithium-ion cell, hydrogenated fullerene is adsorbed to the carbon materials of the anode and thereby improves the anode performance.

In yet another approach for modifying the carbon anode, hydrogenated fullerene solid is mixed homogeneously with the chosen carbon materials and this mixture is used as the anode active material. The hydrogenated fullerene becomes active for modification when the anode is exposed to the electrolyte, preferably when the cell is assembled with the electrolyte in electrochemical contact with the anode, whereby the hydrogenated fullerene of the homogeneous mixture is dissolved in the electrolyte and adsorbed to the carbon. In this approach the electrolyte should also be one that will dissolve the hydrogenated fullerene, such as the carbonate based 1M $LiPF_6$ electrolyte mentioned above.

DESCRIPTION OF THE PREFERRED EMBODIMENTS

In a preferred form of the present invention, the lithium-ion battery is comprised of negative electrodes of hydrogenated fillerene modified carbon materials having high reversible capacity for lithium intercalation and low irreversible capacity loss and positive electrodes comprising lithiated intercalation compounds containing $LiCoO_2$, $LiNiO_2$, $LiMn_2O_4$, $LiMnO_2$, $LiV_2O_5$, $LiV_6O_{13}$, $LiTiS_2$, $Li_3FeN_2$, $Li_7VN_4$, $Li_7MoN_4$, $Li_2ZrN_2$ or combinations of these materials. The substrates for negative and positive electrodes are preferably copper and aluminum foils, respectively.

The electrolyte used in the lithium-ion battery of the present invention is a non-aqueous aprotic organic electrolyte and preferably a non-aqueous solution consisting of a solute, such as $LiPF_6$, $LiBF_4$, $LiAsF_6$, $LiCF_3SO_3$, $LiN(CF_3SO_2)_2$ or $LiClO_4$, dissolved in a solvent such as propylene carbonate, ethylene carbonate, diethyl carbonate, dimethyl carbonate, and dimethoxy ethane as well as mixtures thereof.

The low irreversible capacity loss and high reversible capacity of the lithium-ion cell or battery embodying a modified carbon anode in accordance with the present invention provides ease of cell balance with high capacity cathode and results in a high capacity and high energy density lithium-ion cell. The present invention, however, is not limited to that theory. Suffice it to say, as shall become more apparent in the following Examples, it has been surprisingly discovered that a significant improvement in performance, beyond what might normally be expected, is possible with the lithium-ion battery of the present invention.

There are a number of known approaches suitable for producing hydrogenated fullerene as described in the review article; N. F. Gol'dshleger and A. P. Moravskii, "Fullerene Hydrides: Synthesis, Properties, and Structure," Russian Chemical Reviews, 66 (4) 323–342 (1997). One of the approaches is described in reference by C. Jin, R. Hettich, R. Compton, D. Joyce, J. Blencoe, and T. Burch, "Direct Solid-Phase Hydrogenation of Fullerenes," J. Phys. Chem. 98, 4215 (1994), and was used to produce the hydrogenated fullerene utilized for this invention. In this approach high purity hydrogenated $C_{60}$, and $C_{70}$, and mixed $C_{60}/C_{70}$ can be produced. The present invention is not limited to any specific approach to produce hydrogenated fullerenes.

Figure 3:
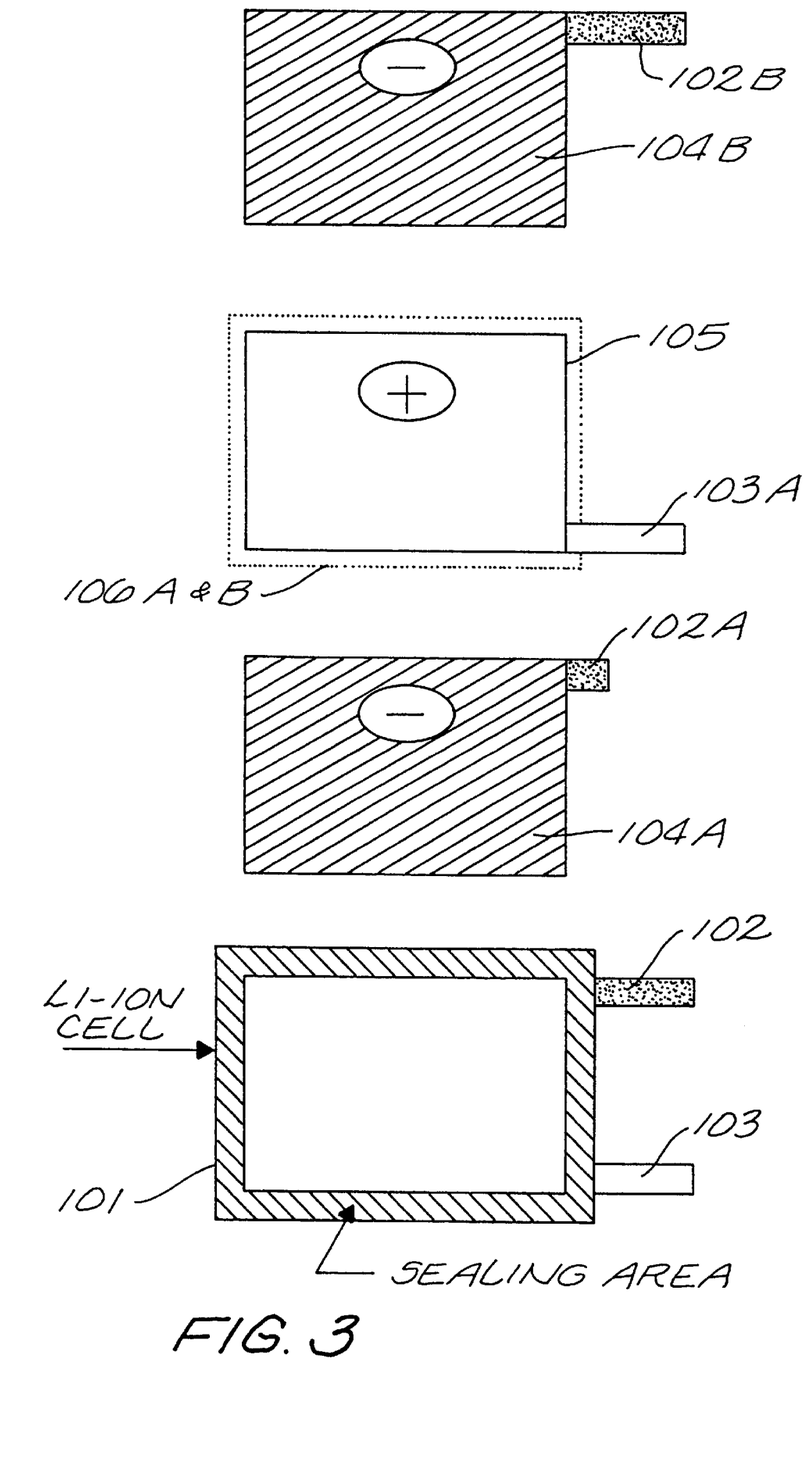
FIG. 3 is a schematic representation of a lithium-ion cell embodying a modified carbon anode in accordance with the present invention.

A preferred form of lithium-ion cell embodying a modified carbon anode having a hydrogenated fullerene material adsorbed thereon is shown in FIG. 3. Wherein the assembled cell 101 is shown with the anode, cathode, and electrolyte enclosed in a sealed sandwich structures with the modified carbon anode electrically accessible by means of protruding conductive copper tab 102 and the lithiated intercalation compound cathode electrically accessible by means of a protruding conductive aluminum tab 103. The anode (not shown) and cathode (not shown) of the assembled cell 101 are separated by a porous separator (not shown) that is permeated with an aprotic non-aqueous electrolyte (not shown) that is in effective contact with both the anode and cathode.

The composition of the electrolyte is described in greater detail above, as are the anode and cathode materials.

In FIG. 3, above the assembled cell 101, there is also shown the components of the cell 101, comprised of a pair of one-sided anodes 104A and 104B and a two-sided cathode 105, suitable to be assembled as a sandwich (cell 101) with the two-sided cathode 105 positioned between the respective anodes 104A and 104B being separated from the cathode 105 by respective porous separators 106A and 106B that are permeated with an aprotic, non-aqueous electrolyte that is in effective contact with both the cathode and the facing anodes.

Conductive copper tabs 102A and 102B are provided for the respective anodes 104A and 104B and an aluminum tab 103A is provided for the two-sided cathode 105, whereby the respective electrodes of the cell 101 are electrically accessible when assembled as a sandwich and enclosed within a sealed enclosure, not shown.

The materials of the respective anodes and cathodes of the cell 101 may be formed of materials, as described above in further detail. For examples, the anodes may be modified carbon comprising carbon having adsorbed thereon hydrogenated fullerenes and supported by a copper foil substrate.

The cathode may be formed of $LiCoO_2$, $LiNiO_2$, $LiMn_2O_4$, $LiMnO_2$, $LiV_2O_5$, $LiV_6O_{13}$, $LiTiS_2$, $Li_3FeN_2$, $Li_7VN_4$, $Li_7MoN_4$, $Li_2ZrN_2$ or a combination thereof, supported by an aluminum foil substrate. The respective anode and cathode electrodes are maintained spaced from one another by a respective electrically non-conductive separator that is permeable whereby the aprotic, non-aqueous electrolyte is carried by the spacers and maintained in effective electrochemical contact with both the cathode and facing anode. The permeable separator may be formed of a micro-porous poly-olefin film.

Although the respective anodes and cathodes of the cell 101 are shown as flat plates, it is to be understood that other configuration can be used, such as spiral or so-called jelly-roll configuration, wherein the respective anode and cathode electrodes are nevertheless maintained physically and electrically spaced from one another by a permeable spacer that carries the electrolyte and maintains it in effective electrochemical contact with the respective anode and cathode surfaces.

It is to be understood that a plurality of electrochemical cells as described above can be used to assemble a battery of such cells by connecting the respective electrodes of the assembly of cells in an electrical circuit defining a battery in known manners desired to produce a battery with the voltage or current characteristics as determined by the number of cells connected in series or parallel circuit relationship.

The following specific Examples are given to illustrate the practice of the invention, but are not to be considered as limiting in any way.

EXAMPLE 1

A hydrogenated fullerene solution was prepared by dissolving 125 mg of hydrogenated $C_{70}$ ($C_{70}H_x$) in 125 ml of decahydronaphthalene in a beaker. 4.875 gm of SFG44 graphite powder was added to the hydrogenated fullerene solution. The solution was stirred with a magnetic stirrer for at least 12 hours. Decahydronaphthalene was then decanted off of the stirred solution to recover SFG44 graphite with adsorbed $C_{70}H_x$ materials which were dried in a vacuum oven at 60° C. overnight to produce modified graphite comprising graphite having the hydrogenated fullerene adsorbed thereon.

The modified graphite was then used as the active material of the anode of a lithium-ion cell to evaluate the concept of the present invention. The lithium-ion cell included a negative electrode made from the modified graphite electrode, a lithiated cobalt dioxide positive electrode and 1M $LiPF_6$ electrolyte in a mixture (2:1 w/w) of ethylene carbonate/dimethyl carbonate (EC/DMC) solvents. A microporous poly-olefin (Celgard 2400) separator was used in between the positive and negative electrodes to isolate them electronically. The modified SFG44 graphite was mixed with 3% carbon black, and 7% polyvinyledene fluoride (PVDF) binder in dimethyl formamide (DMF) and coated on a copper foil to make the negative electrode. The positive electrode was made from a mixture of 85% $LiCoO_2$, 9% carbon black and 6% PVDF in DMF by coating on to an aluminum foil.

The aprotic, non-aqueous 1M $LiPF_6$ electrolyte mixture permeated the micro-porous poly-olefin separator, whereby the electrolyte was in effective contact with both the positive and negative electrodes, which were nevertheless maintained space and electrically isolated from one another.

Figure 1:
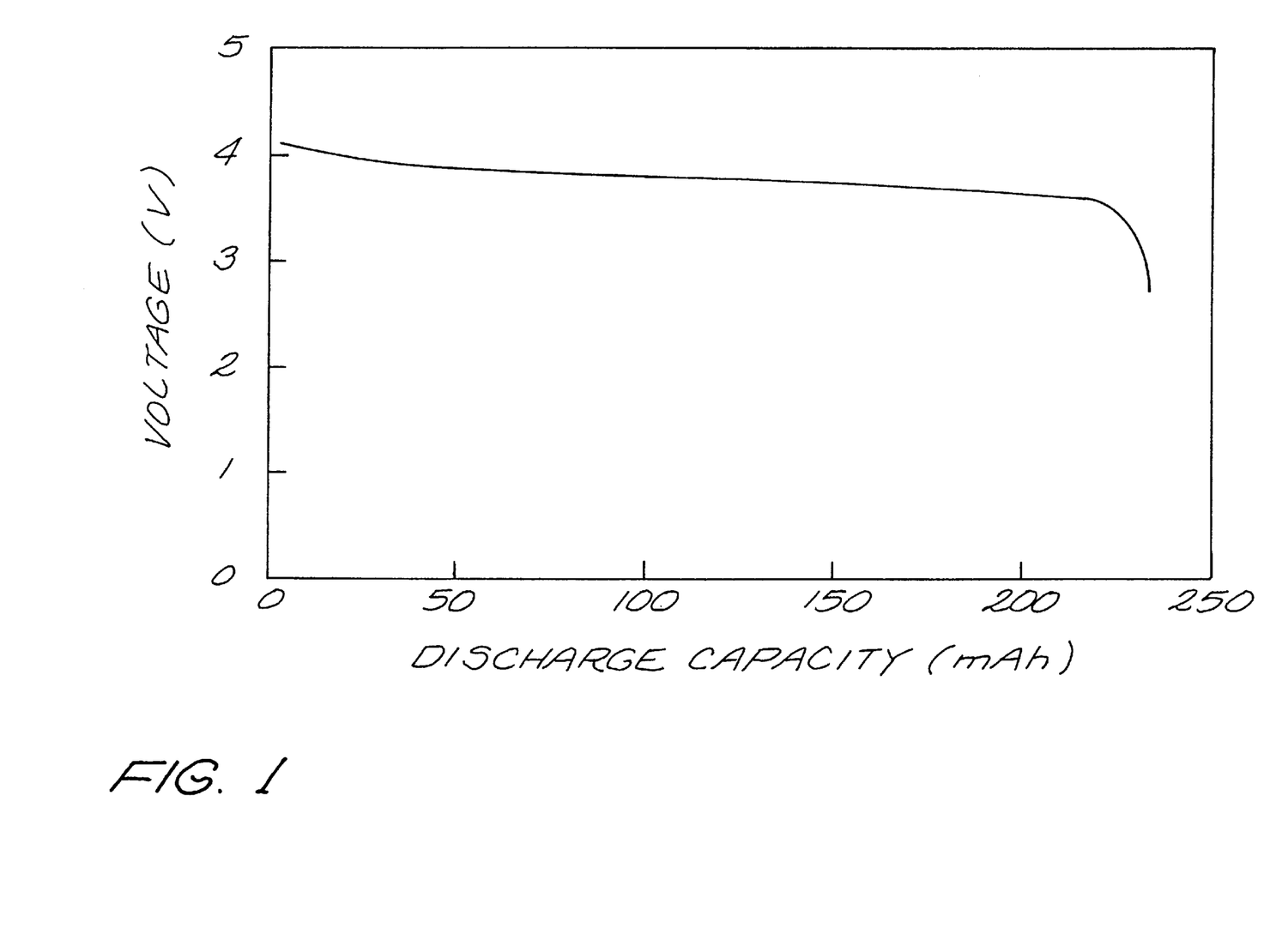
FIG. 1 is a graph representing the first discharge characteristics of a lithium-ion cell made with modified carbon anode in accordance with the present invention.

The developed cell was charged at a constant current of 50 mA to 4.1 V and then at a constant voltage (4.1 V) for 3 hours or until the current dropped to 2 mA. FIG. 1 shows the first discharge characteristics of the developed cell according to the present invention. The first charge capacity of the cell was 257 mAh and the corresponding discharge capacity was 234 mAh. So, the irreversible capacity loss is 9%. The negative electrode (anode) of the cell was made with 0.61 g of the modified graphite. So, the reversible specific capacity of the modified graphite is 384 mAh/g.

Figure 2:
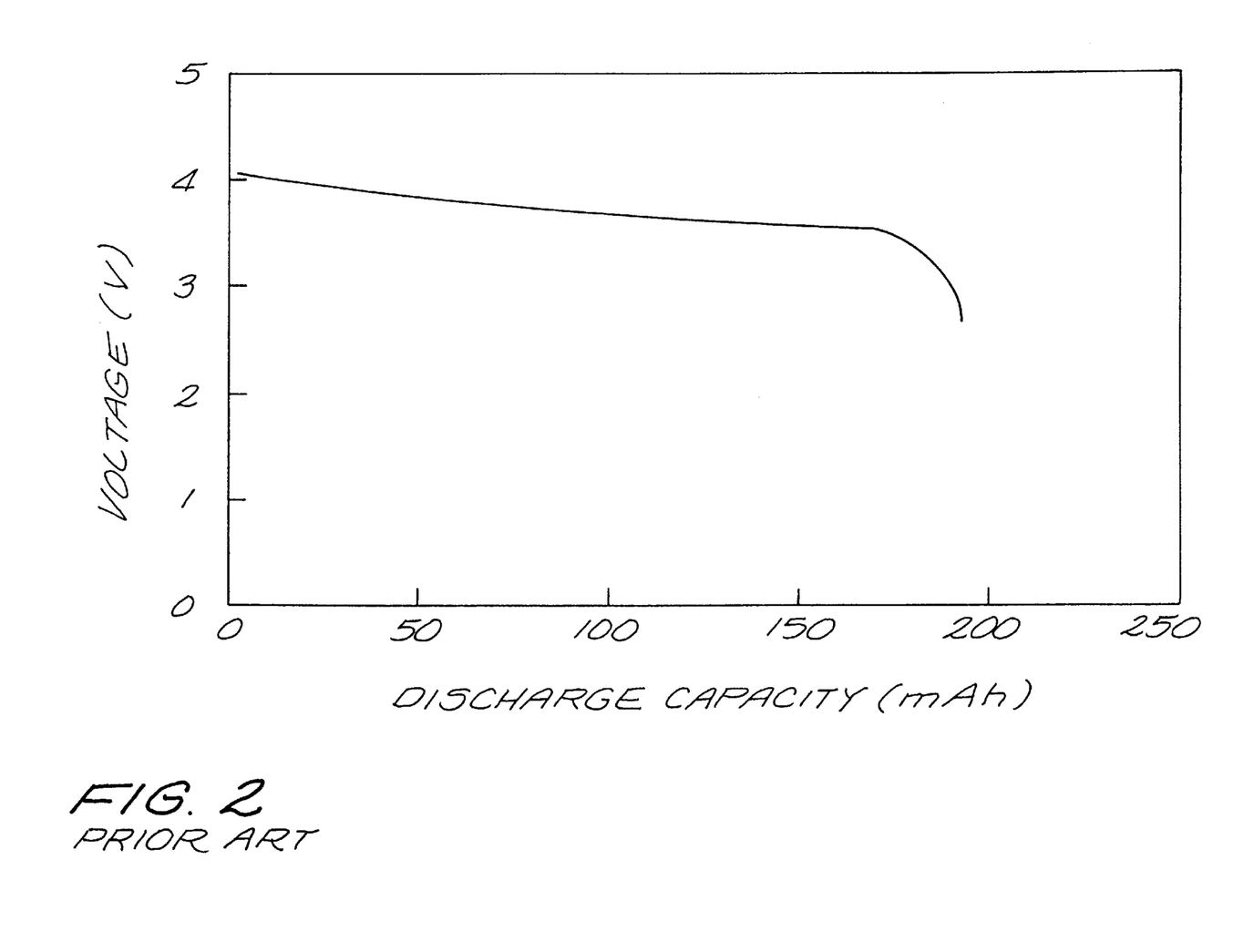
FIG. 2 is a graph representing the first discharge characteristics of a lithium-ion cell made in accordance with the prior art and which utilizes a conventional carbon anode, rather than a modified carbon electrode in accordance with the present invention.

A lithium-ion cell was made with the same components as described above except the active material of the negative electrode was as received SFG44 graphite instead of the modified graphite. The cell was charged and discharged under the same conditions as the previous cell. FIG. 2 shows the first discharge behavior of this prior art cell. The irreversible capacity loss for the first cycle of this cell was 27%. The reversible specific capacity of the anode material was 334 mAh/g.

EXAMPLE 2

Several lithium-ion cells were made as in Example 1 with as received BG39 graphite and varying amounts of hydrogenated fullerenes modified BG39 graphite as active anode materials, lithiated nickel oxide as active cathode material and an electrolyte comprising 1M $LiPF_6$ in a mixture of ethylene carbonate and diethyl carbonate (2:1 w/w). The cells were first charged at a constant current of 50 mA to 4.0 V and then at a constant voltage (4.0 V) for a period of three hours or until the current drops to 2 mA. The first charge and discharge capacity of these cells are shown in Table 1. The results indicate that the addition of hydrogenated mixed fullerenes to modify the graphite forming the carbon anodes of these cells not only decreases the irreversible capacity loss but also increases the reversible capacity of BG39 graphite. Thus, addition of only 4% hydrogenated fullerenes to BG39 graphite increases its reversible capacity from 339 mAh/g to 401 mAh/g. It should be noted that the decrease in the irreversible capacity loss by increasing fullerene hydride from 2.5% to 4% was not associated with decrease in the first charge capacity, but rather by increase in the first discharge capacity. This might indicate that fullerene hydrides contribute to the intercalation process.

TABLE 1

Effect of Hydrogenated mixed Fullerenes on Charge-Discharge Capacity of BG39 Graphite

| Amount of $C_{70}H_x/C_{60}H_x$ (%) | First Charge Anode Specific Capacity (mAh/g) | First Discharge Anode Capacity (mAh/g) | Irreversible Capacity Loss (%) |
|---|---|---|---|
| 0.0 | 471 | 339 | 28 |
| 2.5 | 415 | 369 | 11 |
| 4.0 | 436 | 401 | 8 |

EXAMPLE 3

Two lithium-ion cells designated AA1 and AA2 were made according to the prior art with $LiCoO_2$ as cathode material and S26813 developmental carbon from Superior Graphite as anode material in 1M LiPF$_6$ electrolyte in a mixture of EC/DMC solvents (1:1 v/v). Two similar type of lithium-ion cells designated BB1 and BB2 were also built but the carbon anodes of these cells were activated by being modified in-situ with hydrogenated fullerene saturated 1M LiPF$_6$ electrolyte in a mixture of EC/DMC (1:1 v/v). The four lithium-ion cells were charged and discharged under the conditions specified in Example 2. The observed electrochemical performance of the cells is shown in Table 2. Again, the results demonstrate performance improvement due to C$_{70}$H$_x$ additive absorbed to the carbon anodes of cells BB1 and BB2 as compared with cells AA1 and AA2 having unmodified carbon anodes.

TABLE 2

Effects of C$_{70}$H$_x$ Additive on Lithium-ion Cell Performance

| Cell # | C$_{70}$H$_x$ Additive | Cathode Weight (g) | Anode Weight (g) | Cell Capacity (mAh) | Specific Capacity of Anode (mAh/g) | Irreversible Capacity Loss (%) |
|---|---|---|---|---|---|---|
| AA1 | No  | 2.24 | 0.67 | 202 | 364 | 19 |
| AA2 | No  | 2.30 | 0.68 | 205 | 336 | 21 |
| BB1 | Yes | 2.21 | 0.64 | 224 | 389 | 12 |
| BB2 | Yes | 2.33 | 0.62 | 239 | 428 | 11 |

EXAMPLE 4

Several lithium-ion cells were made as in Example 1 with as received F399 graphite from Alumina Trading of New York, and varying amounts of hydrogenated mixed fullerenes (C$_{60}$H$_x$/C$_{70}$H$_x$) modified F399 graphite as active anode materials, lithiated manganese oxide (LiMn$_2$O$_4$) as active cathode material and 1M LiBF$_4$ in a mixture of ethylene carbonate (EC) and dimethyl carbonate (DMC) solvent (1:1 v/v) as the electrolyte. The cells were charged at a constant current of 50 mA to 4.2 V and then at a constant voltage (4.2 V) for a period of three hours or until the current drops to 2 mA. The first charge and discharge capacities of these cells are shown in Table 3. The results indicate that the addition of hydrogenated fullerenes to F399 graphite anodes in accordance with the present invention not only decreases the irreversible capacity loss but also increases the reversible capacity of F399 graphite anodes as compared with unmodified F399 graphite anodes having no hydrogenated fullerene.

TABLE 3

Effects of Hydrogenated Mixed Fullerenes Additive on Charge-Discharge Capacity of F399 Graphite

| Amount of C$_{60}$H$_x$/C$_{70}$H$_x$ (%) | Anode Charge Capacity (mAh/g) | Anode Discharge Capacity (mAh/g) | Irreversible Capacity (%) |
|---|---|---|---|
| 0   | 409 | 338 | 21 |
| 2.5 | 394 | 360 | 9 |
| 5.0 | 392 | 366 | 7 |

EXAMPLE 5

Several half-cells were prepared with as received BG34 graphite from Superior Graphite and varying amounts of hydrogenated fullerenes modified BG34 graphite as active materials, and lithium metal was used as counter and reference electrodes in electrolyte comprising 1M LiClO$_4$ in a mixture of EC/DMC (1:1 v/v). The first discharge (lithium-ion intercalation to carbon structure) and charge (lithium-ion de-intercalation) capacity of these cells is shown in Table 4. The graphite material as received has significantly high irreversible capacity loss. The addition of hydrogenated fullerenes reduces the irreversible capacity loss to about half the assigned value. Again, it should be noted that increasing the hydrogenated fullerene additives concentration from 2.7% to 5% resulted in an increase in the discharge capacity without a significant change in the charge capacity. This again indicates that hydrogenated fullerene is contributing to the lithium-ion intercalation.

TABLE 4

Effects of C$_{60}$H$_x$ on First Discharge/Charge Capacity of BG34 Graphite

| Amount of C$_{60}$H$_x$ (%) | First Discharge Capacity (mAh/g) | First Charge Capacity (mAh/g) | Irreversible Capacity Loss (%) |
|---|---|---|---|
| 0   | 601 | 339 | 44 |
| 2.7 | 534 | 369 | 31 |
| 5.0 | 536 | 413 | 23 |

EXAMPLE 6

Several half-cells were made with as received amorphous carbon and varying amounts of hydrogenated mixed fullerenes modified amorphous carbon as active anode materials, and lithium metal foil was used as counter and reference electrodes in electrolyte comprising 1M LiN(CF$_3$SO$_2$)$_2$ in a mixture of propylene carbonate and ethylene carbonate (1:1 v/v). The first discharge and charge capacities of these cells are shown in Table 5. The amorphous carbon as received has very high irreversible capacity loss. The addition of hydrogenated fullerenes reduces the irreversible capacity loss significantly as can be seen from the Table 5.

TABLE 5

Effects of Hydrogenated Mixed Fullerene on First Discharge/Charge Capacity of Amorphous Carbon

| Amount of C$_{60}$H$_x$/C$_{70}$H$_x$ (%) | First Discharge Capacity (mAh/g) | First Charge Capacity (mAh/g) | Irreversible Capacity Loss (%) |
|---|---|---|---|
| 0   | 1398 | 736 | 47 |
| 3.0 | 1152 | 742 | 36 |
| 6.0 | 976  | 758 | 22 |

EXAMPLE 7

Several half-cells were prepared with as received 24xG graphite from Alumina Trading of New York and with 2.7% of (C$_{60}$H$_x$+C$_{70}$H$_x$) and 5% C$_{70}$H$_x$ hydrogenated fullerenes modified 24xG graphite, respectively, as active anode materials. Lithium metal was used as counter and reference electrodes in electrolyte comprising 1M LiPF$_6$ in a mixture of EC/DMC (1:1 v/v). The cells were charged at various rates (current density), and the first charge capacity of those cells is shown in Table 6. The graphite material as received has a significant capacity loss with increasing the charge rates (or high current density). The addition of hydrogenated fullerenes to the graphite anode results in higher charge capacity at high charge rates.

TABLE 6

Effect of Hydrogenated Fullerene on First Charge Capacity of 24xG Graphite as a Function of Current Density.

| Current Density mA/cm$^2$ | No additive | 2.7% MFH$_x$ | 5% C$_{70}$H$_x$ |
|---|---|---|---|
| 0.6 | 359 | 423 | 447 |
| 1.2 | 344 | 405 | 421 |
| 2.4 | 302 | 371 | 371 |

What is claimed is:

1. A rechargeable electrochemical cell comprising a body of aprotic, non-aqueous electrolyte, first and second electrodes in effective contact with said electrolyte, the first electrode comprising a lithiated intercalation compound, and the second electrode comprising carbon having a hydrogenated fullerene material adsorbed thereon.

2. An electrochemical cell as defined in claim 1, wherein the fullerene of the hydrogenated fullerene is substantially $C_{60}$.

3. An electrochemical cell as defined in claim 1, wherein the fullerene of the hydrogenated fullerene is substantially $C_{70}$.

4. An electrochemical cell as defined in claim 1, wherein the fullerene of the hydrogenated fullerene is substantially a mixture of $C_{60}$ and $C_{70}$.

5. An electrochemical cell as defined in claim 1, wherein the carbon of the second electrode is graphite or amorphous carbon.

6. An electrochemical cell as defined in claim 1, wherein the lithiated transition metal intercalation compound of the first electrode is comprised essentially of one or more of $LiCoO_2$, $LiNiO_2$, $LiMn_2O_4$, $LiMnO_2$, $LiV_2O_5$, $LiV_6O_{13}$, $LiTiS_2$, $Li_3FeN_2$, $Li_7VN_4$, $Li_7MoN_4$, and $Li_2ZrN_2$.

7. An electrochemical cell as defined in claim 1, wherein the electrolyte is a non-aqueous organic electrolyte solution comprised essentially of a lithium compound solute dissolved in a non-aqueous solvent.

8. An electrochemical cell as defined in claim 7, wherein the electrolyte is comprised of a solute selected from among $LiPF_6$, $LiBF_4$, $LiAsF_6$, $LiCF_3SO_3$, $LiN(CF_3SO_2)_2$, and $LiClO_4$.

9. An electrochemical cell as defined in claim 7, wherein the electrolyte is comprised of a solvent selected from among one or more of propylene carbonate, ethylene carbonate, diethyl carbonate, dimethyl carbonate and dimethoxy ethane.

10. An electrochemical cell as defined in claim 8, wherein the electrolyte is comprised of a solvent selected from among one or more of propylene carbonate, ethylene carbonate, diethyl carbonate, dimethyl carbonate and dimethoxy ethane.

11. An electrochemical cell as defined in claim 1, wherein the lithiated intercalation compound of the first electrode is affixed to an aluminum substrate and the hydrogenated fullerene modified carbon of the second electrode is affixed to a copper substrate.

12. An electrochemical cell as defined in claim 6, wherein the lithiated intercalation compound of the first electrode is affixed to an aluminum substrate and the hydrogenated fullerene modified carbon of the second electrode is affixed to a copper substrate.

13. An electrochemical cell as defined in claim 7, wherein the lithiated intercalation compound of the first electrode is affixed to an aluminum substrate and the hydrogenated fullerene modified carbon of the second electrode is affixed to a copper substrate.

14. An electrochemical cell as defined in claim 8, wherein the lithiated intercalation compound of the first electrode is affixed to an aluminum substrate and the hydrogenated fullerene modified carbon of the second electrode is affixed to a copper substrate.

15. An electrochemical cell as defined in claim 9, wherein the lithiated intercalation compound of the first electrode is affixed to an aluminum substrate and the hydrogenated fullerene modified carbon of the second electrode is affixed to a copper substrate.

16. An electrochemical cell as defined in claim 10, wherein the lithiated intercalation compound of the first electrode is affixed to an aluminum substrate and the hydrogenated fullerene modified carbon of the second electrode is affixed to a copper substrate.

17. An electrochemical cell as defined in claim 2, wherein the carbon of the second electrode is graphite or amorphous carbon.

18. An electrochemical cell as defined in claim 3, wherein the carbon of the second electrode is graphite or amorphous carbon.

19. An electrochemical cell as defined in claim 4, wherein the carbon of the second electrode is graphite or amorphous carbon.

20. An electrochemical cell as defined in claim 1, wherein the first electrode is a cathode that comprises a metal substrate having the lithiated intercalation compound affixed to a surface thereof, wherein the second electrode is an anode that comprises a second metal substrate having affixed to a surface thereof the carbon with hydrogenated fullerene material adsorbed thereon, and wherein said respective surfaces of the cathode and anode are separated from one another by a micro-porous electrically non-conductive separator that is permeated by said aprotic, non-aqueous electrolyte which is in effective contact with said respective surfaces of the anode and cathode.

21. An electrochemical cell as defined in claim 20, wherein the substrate of the cathode comprises a metal plate having the lithiated intercalation compound affixed to both of its opposite sides, wherein the substrate of the anode comprises first and second metal plates each having affixed to a surface thereof the carbon with hydrogenated fullerene material adsorbed thereon, and wherein the cathode plate is sandwiched between the two anode plates with hydrogenated fullerene material facing the anode and separated therefrom by the separators permeated by the electrolyte which is in effective contact with the facing surfaces of the cathode and each anode plate.

22. An electrochemical cell as defined in claim 20, wherein the metal substrate of the cathode is aluminum and the metal substrate of the anode is copper.

23. An electrochemical cell as defined in claim 20, wherein the separator comprises a micro-porous poly-olefin film.

24. An electrochemical cell as defined in claim 21, wherein the cathode and anode plates form a sandwich that is contained within a sealed enclosure and wherein means including the respective substrate of the cathode and anode are provided for connecting said cell to an external electric circuit.

25. An electrochemical cell as defined in claim 22, wherein the separator comprises a micro-porous poly-olefin film.

26. An electrochemical cell as defined in claim 20, wherein the cathode and anode and their respective substrates and the electrolyte permeated separator are all contained within a sealed enclosure and wherein means including the respective substrates of the cathode and anode are provided for connecting said cell to an external electric circuit.

27. A method of making an improved lithium-ion cell that comprises the steps of assembling first and second electrodes in effective electrochemical contact with a body of aprotic, non-aqueous electrolyte while maintaining said electrodes spaced from one another to avoid direct electrical contact between them, the first of said electrodes comprising a lithiated intercalation compound serving as the cathode electrode of said cell and the second of said electrodes comprising a modified carbon material serving as the anode of said cell, and wherein said method further involves the process of producing said modified carbon material by adsorbing hydrogenated fullerene on carbon to form the modified carbon of said anode.

28. The method of claim 27, wherein the process of producing said modified carbon is carried out prior to the step of assembling said electrodes in contact with said electrolyte.

29. The method of claim 28, wherein the process of producing said modified carbon material comprises the steps of:
(i) dissolving hydrogenated fullerene in an organic solvent, to produce a hydrogenated fullerene solution,
(ii) mixing carbon material with the hydrogenated fullerene solution,
(iii) separating the solvent from the mixture of the carbon material and the hydrogenated fullerene solution,
(iv) recovering hydrogenated fullerene modified carbon material from the residue after separation of the solvent from the mixture, and
(v) forming the modified carbon anode from the recovered hydrogenated fullerene modified carbon material for assembly as the anode of said cell.

30. The method of claim 27, wherein the process of producing said modified carbon of the anode is carried out in-situ in the assembled cell.

31. The method of claim 30, wherein the modified carbon material of the anode is produced in-situ by adding hydrogenated fullerene material to the electrolyte used in assembling the cell.

32. The method of claim 31, wherein the electrolyte is 1M solution of $LiPF_6$, $LiBF_4$, $LiClO_4$, $LiAsF_6$, $LiCF_3SO_3$ or $LiN(CF_3SO_2)_2$ in carbonate-based organic solvents, in which the hydrogenated fullerene is dissolved to saturation.

33. The method of claim 27, wherein the hydrogenated fullerene is soluble in the electrolyte, wherein said second electrode that is to be the anode of said cell is formed of a homogeneous mixture of carbon particles and hydrogenated fullerene particles, and wherein the process of producing said modified carbon of the anode is performed by contacting said homogeneous mixture of the second electrode with said electrolyte, whereby hydrogenated fullerene of said mixture is dissolved in the electrolyte and adsorbed to carbon of said mixture.

34. The method of claim 33, wherein the process of producing the modified carbon material of the anode is carried out in-situ by bringing the electrolyte into contact with the homogeneous mixture of said second electrode during assembly of the lithium-ion cell.

35. The method of claim 33, wherein the electrolyte is 1M solution of $LiPF_6$, $LiBF_4$, $LiClO_4$, $LiAsF_6$, $LiCF_3SO_3$ or $LiN(CF_3SO_2)_2$ in carbonate-based organic solvents, in which the hydrogenated fullerene is dissolved to saturation.

36. The method of claim 34, wherein the electrolyte is 1M solution of $LiPF_6$, $LiBF_4$, $LiClO_4$, $LiAsF_6$, $LiCF_3SO_3$ or $LiN(CF_3SO_2)_2$ in carbonate-based organic solvents, in which the hydrogenated fullerene is dissolved to saturation.

37. The method of claim 27, wherein the carbon used in the process of producing the modified carbon for the anode is essentially comprised of powdered graphite or amorphous carbon.

38. The method of claim 28, wherein the carbon used in the process of producing the modified carbon for the anode is essentially comprised of powdered graphite or amorphous carbon.

39. The method of claim 29, wherein the carbon used in the process of producing the modified carbon for the anode is essentially comprised of powdered graphite or amorphous carbon.

40. The method of claim 30, wherein the carbon used in the process of producing the modified carbon for the anode is essentially comprised of powdered graphite or amorphous carbon.

41. The method of claim 31, wherein the carbon used in the process of producing the modified carbon for the anode is essentially comprised of powdered graphite or amorphous carbon.

42. The method of claim 32, wherein the carbon used in the process of producing the modified carbon for the anode is essentially comprised of powdered graphite or amorphous carbon.

43. The method of claim 33, wherein the carbon used in the process of producing the modified carbon for the anode is essentially comprised of powdered graphite or amorphous carbon.

44. The method of claim 27, wherein the fullerene of the hydrogenated fullerene is substantially $C_{60}$.

45. The method of claim 28, wherein the fullerene of the hydrogenated fullerene is substantially $C_{60}$.

46. The method of claim 29, wherein the fullerene of the hydrogenated fullerene is substantially $C_{60}$.

47. The method of claim 30, wherein the fullerene of the hydrogenated fullerene is substantially $C_{60}$.

48. The method of claim 31, wherein the fullerene of the hydrogenated fullerene is substantially $C_{60}$.

49. The method of claim 32, wherein the fullerene of the hydrogenated fullerene is substantially $C_{60}$.

50. The method of claim 33, wherein the fullerene of the hydrogenated fullerene is substantially $C_{60}$.

51. The method of claim 34, wherein the fullerene of the hydrogenated fullerene is substantially $C_{60}$.

52. The method of claim 27, wherein the fullerene of the hydrogenated fullerene is substantially $C_{70}$.

53. The method of claim 28, wherein the fullerene of the hydrogenated fullerene is substantially $C_{70}$.

54. The method of claim 29, wherein the fullerene of the hydrogenated fullerene is substantially $C_{70}$.

55. The method of claim 30, wherein the fullerene of the hydrogenated fullerene is substantially $C_{70}$.

56. The method of claim 31, wherein the fullerene of the hydrogenated fullerene is substantially $C_{70}$.

57. The method of claim 32, wherein the fullerene of the hydrogenated fullerene is substantially $C_{70}$.

58. The method of claim 33, wherein the fullerene of the hydrogenated fullerene is substantially $C_{70}$.

59. The method of claim 34, wherein the fullerene of the hydrogenated fullerene is substantially $C_{70}$.

60. The method of claim 27, wherein the fullerene of the hydrogenated fullerene is substantially a mixture of $C_{60}$ and $C_{70}$.

61. The method of claim 28, wherein the fullerene of the hydrogenated fullerene is substantially a mixture of $C_{60}$ and $C_{70}$.

62. The method of claim 29, wherein the fullerene of the hydrogenated fullerene is substantially a mixture of $C_{60}$ and $C_{70}$.

63. The method of claim 30, wherein the fullerene of the hydrogenated fullerene is substantially a mixture of $C_{60}$ and $C_{70}$.

64. The method of claim 31, wherein the fullerene of the hydrogenated fullerene is substantially a mixture of $C_{60}$ and $C_{70}$.

65. The method of claim 32, wherein the fullerene of the hydrogenated fullerene is substantially a mixture of $C_{60}$ and $C_{70}$.

66. The method of claim 33, wherein the fullerene of the hydrogenated fullerene is substantially a mixture of $C_{60}$ and $C_{70}$.

67. The method of claim 34, wherein the fullerene of the hydrogenated fullerene is substantially a mixture of $C_{60}$ and $C_{70}$.

68. A battery comprising a plurality of electrochemical cells as defined in claim 1, having their respective electrodes connected in an electric circuit defining a battery of said cells.

69. A battery comprising a plurality of electrochemical cells as defined in claim 20, having their respective electrodes connected in an electric circuit defining a battery of said cells.

70. A battery comprising a plurality of electrochemical cells as defined in claim 22, having their respective electrodes connected in an electric circuit defining a battery of said cells.

71. A battery comprising a plurality of electrochemical cells as defined in claim 25, having their respective electrodes connected in an electric circuit defining a battery of said cells.

* * * * *